(12) United States Patent
Larnholm

(10) Patent No.: US 11,406,917 B2
(45) Date of Patent: Aug. 9, 2022

(54) OIL DROPLET FLOTATION UNIT WITH WEIRS AND HYDRAULIC MEANS

(71) Applicant: Sulzer Management AG, Winterthur (CH)

(72) Inventor: Per Reidar Larnholm, Moss (NO)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 17/270,214

(22) PCT Filed: Aug. 22, 2019

(86) PCT No.: PCT/EP2019/072526
§ 371 (c)(1),
(2) Date: Feb. 22, 2021

(87) PCT Pub. No.: WO2020/043599
PCT Pub. Date: Mar. 5, 2020

(65) Prior Publication Data
US 2021/0331087 A1    Oct. 28, 2021

(30) Foreign Application Priority Data
Aug. 29, 2018   (EP) .................................... 18191552

(51) Int. Cl.
*B01D 17/035*    (2006.01)
*C02F 1/24*      (2006.01)
(Continued)

(52) U.S. Cl.
CPC ...... *B01D 17/0205* (2013.01); *B01D 17/0211* (2013.01); *B01D 17/0214* (2013.01);
(Continued)

(58) Field of Classification Search
CPC ............ B01D 17/0205; B01D 17/0211; B01D 17/0214; C02F 1/24; C02F 1/40
(Continued)

(56) References Cited

U.S. PATENT DOCUMENTS 4,618,430 A    10/1986  Favret, Jr. et al.
5,132,010 A *   7/1992  Ossenkop .......... B01D 17/0214
                                              210/522
(Continued)

FOREIGN PATENT DOCUMENTS

CH        573 773 A5    3/1976
DE        3423587 A1    1/1986
(Continued)

OTHER PUBLICATIONS

Extended European Search Report dated Mar. 6, 2019 in corresponding European Patent Application No. 18191552.1, filed Aug. 29, 2018.
(Continued)

*Primary Examiner* — Christopher Upton
(74) *Attorney, Agent, or Firm* — Global IP Counselors, LLP

(57) ABSTRACT

A flotation apparatus for separating oil from a dispersion containing water as a continuous phase and oil as a dispersed phase. The apparatus comprises a vessel having one or more longitudinal cell sections in its longitudinal direction, at least one of the one or more longitudinal cell sections comprising: an underflow weir, an overflow weir displaced downstream from the underflow weir, a gas injection structure located below the underflow weir or in the channel formed between the underflow weir and the overflow weir, a removal structure for removing a fraction formed during the operation of the flotation apparatus on the liquid level from the liquid level, and a hydraulic structure for hydrau-
(Continued)

lically pushing the fraction formed during the operation of the flotation apparatus on the liquid level into the removal structure using a liquid stream, a liquid/gas stream and/or a gas stream that is ejected by the hydraulic structure.

15 Claims, 2 Drawing Sheets

(51) Int. Cl.
*B01D 17/02* (2006.01)
*B01D 21/00* (2006.01)
*B01D 21/24* (2006.01)
*C02F 1/40* (2006.01)
*C02F 1/00* (2006.01)
*C02F 101/32* (2006.01)

(52) U.S. Cl.
CPC ..... *B01D 21/0045* (2013.01); *B01D 21/2433* (2013.01); *C02F 1/24* (2013.01); *C02F 1/40* (2013.01); *C02F 2001/007* (2013.01); *C02F 2101/32* (2013.01)

(58) Field of Classification Search
USPC ..... 210/703, 801, 221.2, 521, 522, 539, 540
See application file for complete search history.

(56) References Cited

U.S. PATENT DOCUMENTS

| 2011/0114565 A1* | 5/2011 | Roberts | C02F 1/24 |
| | | | 210/703 |
| 2013/0075338 A1 | 3/2013 | Murtagh | |
| 2016/0038855 A1 | 2/2016 | Kirk et al. | |
| 2017/0121185 A1* | 5/2017 | Lee | C02F 1/24 |

FOREIGN PATENT DOCUMENTS

| GB | 573 093 A | 11/1945 |
| GB | 1 475 631 A | 6/1977 |
| SU | 1767 A1 | 10/1926 |
| SU | 996333 A1 | 2/1983 |
| SU | 1564119 A1 | 5/1990 |

OTHER PUBLICATIONS

International Search Report and Written Opinion dated Nov. 27, 2019 in corresponding International Patent Application No. PCT/EP2019/072526, filed Aug. 22, 2019.

International Preliminary Report on Patentability dated Sep. 30, 2020 in corresponding International Patent Application No. PCT/EP2019/072526, filed Aug. 22, 2019.

Search Report dated Nov. 26, 2021 in corresponding Russian Application No. 2021106896, filed Aug. 22, 2019.

Decision of Grant dated Nov. 26, 2021 in corresponding Russian Application No. 2021106896, filed Aug. 22, 2019.

* cited by examiner

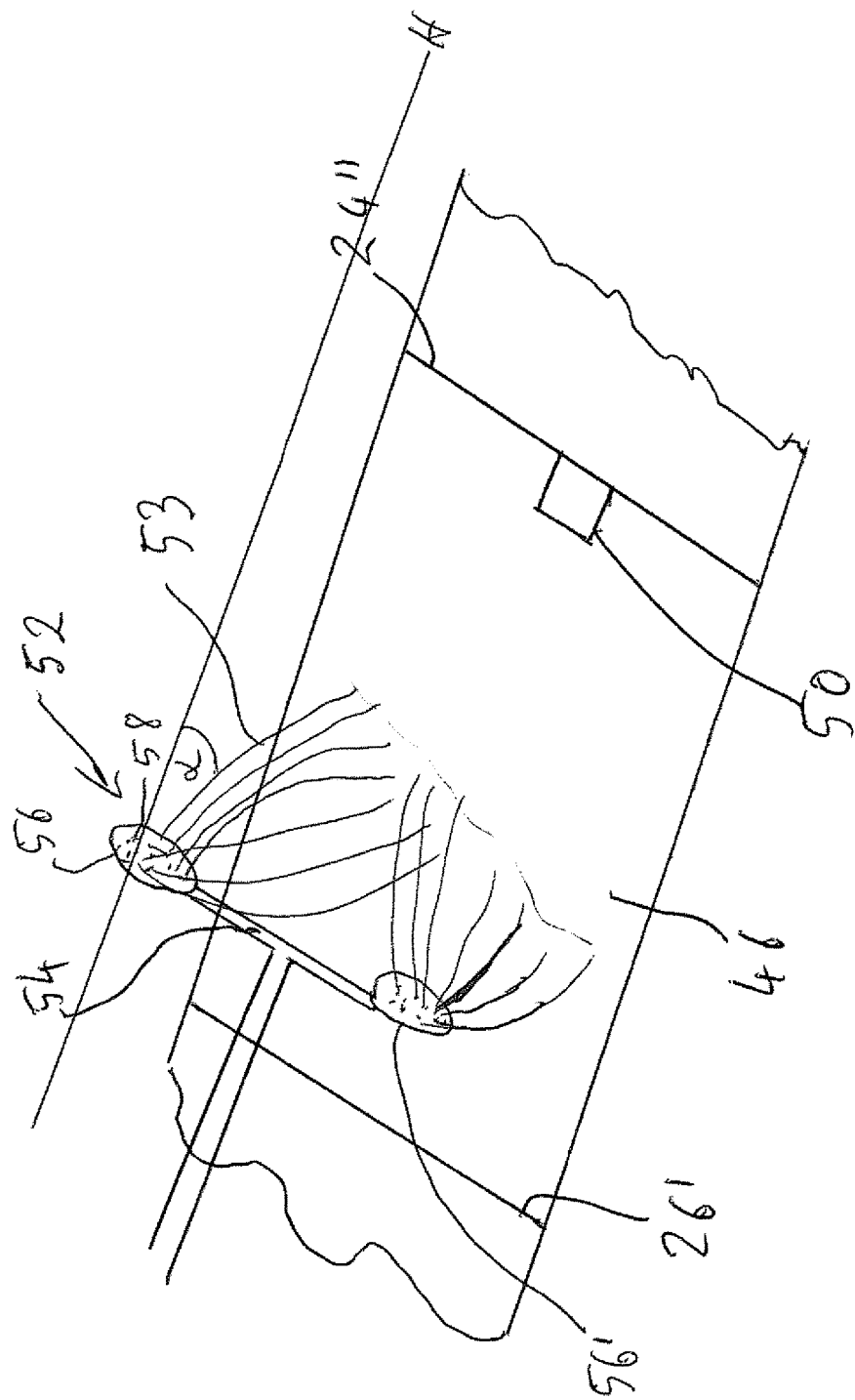

OIL DROPLET FLOTATION UNIT WITH WEIRS AND HYDRAULIC MEANS

CROSS-REFERENCE TO RELATED APPLICATIONS

This application is a U.S. National Stage application of International Application No. PCT/EP2019/072526, filed Aug. 22, 2019, which claims priority to European Patent Application No. 18191552.1, filed Aug. 29, 2018, the contents of each of which are hereby incorporated herein by reference.

BACKGROUND

Field of the Invention

The present invention relates to a flotation apparatus for separating one phase from a dispersion containing at least a first continuous phase and a second dispersed phase so as to form a first fraction being low in the second dispersed phase and a second fraction being rich in the second dispersed phase. The flotation apparatus is in particular suitable for separating oil from a dispersion containing water as continuous phase and oil as dispersed phase so as to form a clear water fraction and a fraction being rich in oil. Moreover, the present invention relates to a method for separating one phase from a dispersion containing at least a first continuous phase and a second dispersed phase and in particular for separating oil from a dispersion containing water as continuous phase and oil as dispersed phase making use of the flotation apparatus.

Background Information

Flotation is a physical separating method using gas bubbles for the separation of a liquid, such as oil, and/or a solid material from a continuous phase, such as water, in which the liquid and/or solid material to be separated is/are dispersed. Flotation utilizes the different surface tension of solid materials or of hydrophobic liquids, such as oil, relative to the hydrophilic liquid of the continuous phase, such as water. Air, carbon dioxide or inert gases, such as nitrogen, are mainly used as gas in the known flotation processes. The gas bubbles adhere to the dispersed phase, which leads to aggregates of dispersed phase particles and/or dispersed phase droplets with attached gas bubbles, wherein the aggregates have—on account of the adhered gas bubbles—a lower density than the continuous phase. Due to this, the aggregates rise or float up, respectively, to the surface of the continuous phase forming an oil-froth layer or sludge layer, respectively, which is then removed for instance by a skimming device.

SUMMARY

A prominent example for the application of flotation technology is the separation of fine grained solids, such as of ores, from other solid particles in an aqueous suspension. Often surfactants and foam stabilizers are contained in the flotation bath in order to stabilize the formed aggregates with adhered air bubbles. The ore particles are only poorly wetted with water and thus adhere to the air bubbles. While the aggregates float up and can be skimmed off, the remaining particles are intended to remain in the slick and are pumped off at the end of the flotation process.

Other examples for the application of flotation technology are the paper industry and the sewage purification. In the manufacture of paper from waste paper a water/waste paper mixture is subjected to flotation in order to remove the printing color. In just the same way, fine contaminant particles and suspended materials are floated and thus separated from water in sewage purification processes.

Another important example for the application of flotation technology is the removal of oil droplets from water. Oily wastewaters are for instance generated during the production, the processing, the transportation, the storage and the use of petroleum and its products. During the flotation, the gas bubbles adhere to the oil droplets, which are dispersed in the water, thus forming oil droplet-gas bubble aggregates, which float up to the water level and form there an oil-froth layer, which is mechanically skimmed off for instance by means of a sludge scraper. The remaining water—which is at least largely freed of oil droplets—is extracted via one or more outlets as clear water.

There are essentially two types of flotation processes, namely dissolved gas flotation (DGF) and induced gas flotation (IGF). The difference between the two technologies is the kind of gas bubble generation and the resulting bubble sizes. During the DGF, a water stream with gas, particularly air, being dissolved under pressure in the water is introduced into the flotation apparatus, where the pressure is immediately relieved and therefore the pressurized air releases so as to form tiny bubbles, which typically have an average size of 10 to 100 µm. This bubble size is in particular preferred in the case of separating oil droplets from a continuous water phase, since the gas bubbles are of the same size range as the oil droplets and this increases the efficiency of the adherence of gas bubbles to oil droplets. Much larger gas bubbles have a significantly worse capture efficiency of the smaller oil droplets, because the distance between the gas bubbles correlates linearly with their size.

In contrast to DGF, during an IGF gas is introduced into the dispersion through a mixing device, such as an impeller, an eductor, a sparger system, orifices or other devices, thus generating gas bubbles therein. In some cases bulk gas is introduced through the mixing device alone and in others cases bulk gas is mixed with water before being introduced to the mixing device or bubble generator. Typically, these types of mixing devices generate much larger gas bubbles than in a DGF process, i.e. gas bubbles having an average size of 1 to 100 mm.

US 2013/0075338 A1 discloses an IGF flotation apparatus for the separation of oil from a produced water stream, which comprises an elongated vessel having at one end an inlet for produced water and at the other end an oil outlet and an outlet for purified water. The vessel further includes a plurality of gas eductors in its lower half for introducing a gas flow into the vessel and further includes a series of spaced-apart perforated baffles arranged perpendicular to the longitudinal axis of the vessel, which subdivide the vessel into several cells. Each of the baffles has a plurality of circular perforations in a triangular pattern and is arranged such that a flow of water passing through each perforated baffle maintains a constant direction of flow through the series of perforated baffles. Each of the eductors in the plurality of gas eductors is located between an adjacent pair of perforated baffles in the series of spaced-apart perforated baffles. The floated oil/gas aggregates are collected in skim buckets and are withdrawn therefrom. A disadvantage of this flotation vessel lies in the fact that it has a suboptimal separation efficiency so that the purified water still contains a significant amount of oil. One reason therefore is that the aggregation formation efficiency is suboptimal, i.e. that the gas bubbles do not adhere to essentially all oil droplets included in the dispersion so that not essentially all oil raises up to the surface of the water. Another reason therefore is that the oil-froth layer or sludge layer, respectively, which forms on the water level is very sticky and without sufficient momentum, why the oil-froth layer does not properly flow in a sufficient manner into the skim buckets and thus is only incompletely removed from the water.

In view of this, the object underlying the present invention is thus to provide a flotation apparatus for separating one phase from a dispersion containing at least a first continuous phase and a second dispersed phase so as to form a first fraction being low in the second dispersed phase and a second fraction being rich in the second dispersed phase, which has an improved separation efficiency of at least 90% and which is in particular suitable for separating oil from a dispersion containing water as continuous phase and oil as dispersed phase so as to form a fraction being rich in oil and a clear water fraction.

In accordance with an embodiment of the present invention, this object is satisfied by providing a flotation apparatus for separating one phase from a dispersion containing at least a first continuous phase and a second dispersed phase so as to form a first fraction being low in the second dispersed phase and a second fraction being rich in the second dispersed phase, the flotation apparatus comprising a vessel having:

an inlet defining an upstream end of the vessel,
a first outlet for the first fraction defining a downstream end of the vessel,
a second outlet for the second fraction,
gas outlet,
at least one underflow weir,
at least one overflow weir, the overflow weir being located in a direction toward the downstream end of the vessel from the underflow weir,
at least one gas injection unit comprising at least one opening configured to inject gas or a dispersion of gas in liquid into the vessel, the at least one opening of the at least one gas injection unit being located vertically below the underflow weir or being located between the underflow weir and the overflow weir,
at least one container configured to remove the second fraction from the liquid level, the second fraction being formed during operation of the flotation apparatus on the liquid level, and
at least one ejector configured to hydraulically push the second fraction into the container using at least one of a liquid stream, a liquid/gas stream, and a gas stream, the respective at least one of the liquid stream, the liquid/gas stream, and the gas stream being ejected by the ejector onto at least one of: the liquid level of the vessel, and the second fraction formed on the liquid level during the operation of the flotation apparatus, and
a vertical distance between the underflow weir and the overflow weir being 30 to 80% of a height of the vessel, the vertical distance between the underflow weir and the overflow weir being a distance between a lower edge of the underflow weir and an upper edge of the overflow weir.

An ejector unit for hydraulically pushing the second fraction being formed during the operation of the flotation apparatus on the liquid level of the vessel into the removal unit, such as a skim bucket, is defined in the present invention as a device, which does not—such as it is done by a skimming device, such as a sludge scraper—mechanically push the second fraction into the removal unit, but pushes the second fraction into the removal unit using at least one of a liquid stream, a liquid/gas stream, and a gas stream, the respective liquid stream, liquid/gas stream or gas stream being ejected by the ejector unit onto the liquid level of the vessel or onto the oil-froth layer (i.e. the second fraction being formed during the operation of the flotation apparatus on the liquid level), respectively.

This solution bases on the surprising finding that by the combination of an underflow weir and an overflow weir in a flotation vessel, with the overflow weir being arranged downstream of the underflow weir, in further combination with the arrangement of the gas injection unit in the channel formed between the underflow weir and the overflow weir and in further combination with the provision of an ejector unit for hydraulically pushing the second fraction being formed during the operation of the flotation apparatus on the liquid level of the vessel into the removal unit, a flotation apparatus with a significantly improved separation efficiency is obtained. The flotation apparatus in accordance with the present invention is particularly suitable to remove oil droplets from a dispersion of oil in water with a very high separation efficiency. In particular, the flotation apparatus in accordance with the present invention allows to remove far more than 90% of oil droplets from a water-oil dispersion including as much as several thousands ppm oil, such as for instance more than 98% oil from a water-oil dispersion initially including 300 ppm to 1,000 ppm oil. The underflow weir and overflow weir form the entrance and mixing section of the flotation vessel, in which an efficient gas injection and a homogenous gas bubble distribution in the water-oil dispersion is achieved due to the specific arrangement of the weirs and of the gas injection unit as described above. This allows the gas bubbles to efficiently adhere to the oil droplets. The flotation section, where the aggregates of gas bubbles adhered to oil droplets float up or have been already floated up, is formed downstream of the overflow weir and allows that—due to the efficient gas bubble adherence effected in the entrance and mixing section—essentially all of the oil droplets rise up to the water level and to form there an oil-froth layer or sludge layer, respectively. Even if this oil-froth layer is very sticky and has not a sufficient momentum, it is efficiently, i.e. at least essentially completely, removed from the water level by hydraulically pushing it using the ejector into the removal unit, from which it is withdrawn from the flotation apparatus. Another advantage of the arrangement of the overflow weir in a distance to and displaced in the direction to the downstream end of the vessel from the underflow weir and of the provision of the gas injection unit so that the at least one opening of the gas injection unit is located vertically below the underflow weir or is located between the underflow weir and the overflow weir is that the aggregates of gas bubbles adhered to oil droplets are already at least substantially risen up in the dispersion, before the dispersion flows over the upper edge of the overflow weir. On account of this reason, the respective aggregates do not or at least do not significantly disturb the water in the flotation section so that the water can flow essentially unhindered from the overflow weir down to the lower edge of the underflow weir arranged downstream thereof. All in all, the present invention provides a flotation apparatus for separating one phase from a dispersion containing at least a first continuous phase and a second dispersed phase and in particular for separating oil from water, which has an improved separation efficiency of at least 90% and in particular of at least 98%.

In a preferred embodiment of the present invention:
the at least one underflow weir extends down from its upper edge being fixed at the upper part (and preferably at the top side) of the vessel to its lower edge which terminates above the bottom of the vessel so as to form a channel between the lower edge of the underflow weir and the bottom of the vessel so as to allow dispersion to flow through the channel and the at least one overflow weir extends up from its lower edge being fixed at the bottom of the vessel to its upper edge which terminates underneath the head of the vessel so as to form a channel between the upper edge of the weir and the head of the vessel so as to allow dispersion to flow over the upper edge of the overflow weir and through the channel, wherein the overflow weir is located in a distance to and displaced in the direction to the downstream end of the vessel from the underflow weir so as to form between the underflow weir and the overflow weir a horizontal channel allowing the dispersion to flow from the bottom up to the upper edge of the overflow weir.

Bottom of the vessel means the lowermost plane, edge or point of the cavity of the vessel. Thus, in the case of a cubic vessel, the bottom is the inner surface of the wall of the underside or bottom side, respectively, of the vessel. In the case of a horizontal cylindrical vessel, the bottom is the lowermost line of the wall of the underside or bottom side, respectively, of the vessel. In the case of a vertical cylindrical vessel with a spherical sump, the bottom is the lowermost point of the wall of the spherical sump of the vessel.

In line therewith, head of the vessel means the uppermost plane, edge or point of the cavity of the vessel. Thus, in the case of a cubic vessel, the head is the inner surface of the wall of the top side of the vessel. In the case of a horizontal cylindrical vessel, the head is the uppermost line of the wall of the top side of the vessel. In the case of a vertical cylindrical vessel with a spherical top, the head is the uppermost point of the wall of the spherical top of the vessel.

Upper part of the vessel means the part of the vessel forming—seen in the vertical direction—the upper half of the vessel.

In principle, the present invention is not particularly restricted with regard to the position of the at least one ejector unit and with regard to the position of the at least one removal unit in the vessel, as long as the removal unit allows to remove the second fraction being formed during the operation of the flotation apparatus on the liquid level from the liquid level and as long as the ejector unit allows to push the second fraction into the removal unit using a stream of liquid, a stream of gas or a stream of liquid and gas. Preferably, the at least one removal unit as well as the at least one ejector unit are both arranged downstream of the overflow weir, i.e. in the flotation section of the vessel. More preferably, the removal unit, such as a skim bucket, is arranged at the downstream end of the flotation section of the vessel and the ejector unit is arranged upstream of the removal unit, but still in the flotation section of the vessel.

In a further development of embodiments of the present invention, it is suggested that the at least one ejector unit is arranged at the height of the upper edge of the overflow weir or at a height being above the upper edge of the overflow weir.

In accordance with a particular preferred embodiment of the present invention, the flotation apparatus comprises at least one further underflow weir being arranged downstream of the at least one overflow weir, wherein the at last one removal unit and the at least one ejector unit are arranged between the at least one overflow weir and the at least one further underflow weir being located downstream of the overflow weir. Thus, if the flotation apparatus comprises more than one overflow weir, each one further underflow weir is arranged downstream of each of the overflow weirs, wherein each ejector unit is arranged between an overflow weir and the further underflow weir being located downstream of the respective overflow weir.

Preferably, all of the overflow weirs are vertical walls without any sloped area, so that none of these weirs induces during the operation a rotational flow in the flotation apparatus and particularly in the flotation section of the flotation apparatus. It if further preferred that the apparatus does not contain any other unit for inducing a rotational flow, but that the flotation section is embodied as a calming section.

The present invention is not particularly limited concerning the kind of ejector unit, as long as it allows to push the second fraction being formed during the operation of the flotation apparatus on the liquid level of the vessel into the removal unit using a stream of liquid, a stream of gas or a stream of liquid and gas. Thus, the at least one ejector unit (which is subsequently also shortly referred to as "ejector unit") is a unit for ejecting at least one of a stream of liquid, a stream of gas or a stream of liquid and gas onto the liquid level of the vessel or onto the second fraction (in particular oil-froth layer) being formed during the operation of the flotation apparatus on the liquid level of the vessel. Preferably, the ejector unit ejects a stream of liquid, such as a stream of water.

As set out above, the ejector unit for ejecting a stream of liquid, a stream of gas or a stream of liquid and gas onto at least one of the liquid level of the vessel and the second fraction formed during the operation of the flotation apparatus on the liquid level of the vessel is preferably arranged and embodied so that the ejected stream pushes the second fraction being formed during the operation of the flotation apparatus on the liquid level of the vessel into the removal unit. Therefore, the ejector unit is preferably arranged so that it has openings for ejecting the stream at the height of the upper edge of the overflow weir, i.e. where during the operation of the flotation apparatus the water level forms, or slightly above this height, such as up to 20%, preferably up to 10% and more preferably up to 5% of the total height of the vessel above the height of the upper edge of the overflow weir.

Therefore, it is preferred that the openings of the ejector unit are arranged at the same height or as the upper edge of the removal unit or above this height.

In accordance with a preferred embodiment of the present invention, this is achieved by providing as at least one ejector unit a pipe comprising one or more spray heads, wherein each of the one or more spray heads comprises at least one spray nozzles. In order to obtain a particular good and homogeneous distribution of the stream of liquid, the stream of gas or the stream of liquid and gas after exiting the ejector unit, it is in this embodiment of the present invention especially preferred that the ejector unit is a pipe comprising two or more spray heads, wherein each of the spray heads comprises a plurality of spray nozzles, wherein plurality of spray nozzles means more than five, even more than ten, even dozens or even hundreds of spray nozzles.

In a further development of an embodiment of the present invention, it is suggested that the at least one ejector unit is embodied so that it ejects the stream of liquid, the stream of gas or the stream of liquid and gas in the horizontal plane or at an angle of more than 0° to 20° angled downwards from the horizontal plane. Also in this embodiment, it is preferred that the at least one ejector unit is embodied for ejecting a stream of liquid. The ejection of the stream in the horizontal plane or at an angle of more than 0° to 20° angled downwards from the horizontal plane allows to eject the stream so that it does not significantly disturb or swirl, respectively, the continuous phase level (in particular water level) and the second fraction layer (in particular oil-froth layer) formed thereon, such as it would be the case when directing a liquid stream perpendicular onto the water level. At the same time the ejection of the stream in the horizontal plane or at an angle of more than 0° to 20° angled downwards from the horizontal plane allows to eject the stream so that it efficiently pushes the second fraction being formed during the operation of the flotation apparatus on the liquid level of the vessel into the removal unit, such as a skim bucket being arranged downstream of the ejector unit at the height of the water level.

On account of the same reasons, it is preferred that the at least one ejector unit ejects the stream of liquid, the stream of gas or the stream of liquid and gas in the form of a film over at least 30% of the width of the vessel. It is also preferred in this embodiment that the at least one ejector unit is embodied for ejecting a stream of liquid. More preferably, the at least one ejector unit ejects the stream of liquid, the stream of gas or the stream of liquid and gas in the form of a film over at least 50%, further preferably over at least 80%, even more preferably over at least 90% and most preferably of the whole width of the vessel.

It is proposed in a further development of the aforementioned embodiment of the present invention that the at least one ejector unit is embodied so as to eject the stream of liquid, the stream of gas or the stream of liquid and gas in the form of an at least essentially homogenous film. Film means in this connection that neither an aerosol of liquid droplets in air nor several single liquid jets form after the ejection of the stream of liquid from the ejector unit, but that a liquid film or very thin liquid layer, respectively, forms, which pushes the second fraction into the removal unit likewise to a bar moving slightly above the liquid level into the direction of the removal unit. An essentially homogenous film means in this connection a liquid film, in which the difference of the flow rate over the width of the liquid film is less than 25% of the average flow rate of the film. In order to achieve the formation of such as film, the liquid has to be ejected through the spray head of the ejector unit having a suitable small distance between the nozzles of the spray head and a suitable high number of nozzles in the spray head with a sufficiently high pressure so as to achieve such an essentially homogenous liquid film. If now spray head with nozzles is used, the liquid has to be ejected through the ejector unit so that a sufficient number of liquid droplets being close enough to adjacent droplets is formed and pressed with a sufficiently high pressure through the ejector unit so as to achieve such an essentially homogenous liquid film.

The present invention is not particularly restricted concerning the kind of the removal unit for removing the second fraction being formed during the operation of the flotation apparatus on the liquid level from the liquid level. Good results are in particular obtained, when the at least one removal unit is a skimming system, such as one or more adjustable skimming system(s) or one or more skim bucket(s). Preferably, the removal unit is a skim bucket, which is arranged at the downstream end of the vessel, wherein the removal unit comprises at its upper end an overflow edge, which is arranged at the height of the upper edge of the overflow weir. Such a skim bucket allows in combination with the aforementioned ejector unit pushing the second fraction into the skim bucket to efficiently remove the second phase (in particular oil-froth layer) from the continuous phase level (in particular water level) without swirling or at least without notably swirling the continuous phase level and the second fraction layer formed thereon.

In order to not lose too much residual water included in the second fraction or oil-froth mixture, respectively, removed from the vessel via the at least one removal unit, a sludge separator can be provided downstream of the at least one removal unit, wherein this sludge separator separates residual water from the second fraction. The removed water can be recycled into the vessel of the flotation apparatus and preferably into the inlet or into the channel formed between the underflow weir and the overflow weir.

In accordance with an embodiment of the present invention, the at least one gas injection unit comprises at least one opening for injecting gas or a dispersion/solution of gas in liquid into the vessel, wherein the at least one opening of the at least one gas injection unit is located vertically below the underflow weir or is located in the channel formed between the underflow weir and the overflow weir. Preferably, the at least one opening of the at least one gas injection unit is arranged in the channel at a height being below the lower edge of the underflow weir (but it can be arranged above the lower edge), and more preferably, the at least one opening of the at least one gas injection unit is arranged vertically below the lower edge of the underflow weir, in order to improve the separation efficiency.

In principle, the at least one gas injection unit can be any gas injection unit known by a person skilled in the art. Preferably, the flotation apparatus in accordance with the present invention is used for DGF and therefore it is preferred that the at least one gas injection unit is a DGF injection unit. For instance, the at least one gas injection unit comprises a pipe, which comprises a pressure release valve so as to keep the mixture including liquid and pressurized gas upstream of the pressure release valve under pressure (such as 300 to 600 kPa), wherein this pressure is immediately removed after the pressure release valve so as to allow the gas to form in the dispersion tiny gas bubbles preferably with an average bubble size of 10 to 100 µm.

In order to achieve a good and homogeneous distribution of the gas bubbles in the dispersion, it is suggested in a further development of the present invention that the at least one gas injection unit further comprises a distributor, which comprises a plurality of openings for distributing the gas into the dispersion. Preferably, the openings of the distributor are circular and have a diameter of e.g. 10 to 30 mm. The distributor is for instance a pipe extending perpendicular to the longitudinal axis of the vessel, i.e. in the width direction of the vessel, wherein the pipe wall of the upper half of the pipe is provided with a plurality of openings.

In order to achieve a broad distribution of the gas bubbles it is further preferred that the openings of the distributor extend over at least 25% and preferably over at least 50% of the width of the vessel so as to allow a homogenous distribution of the gas bubbles over the cross-section of the vessel into the dispersion.

Alternatively to the one or more DGF injection units, it is possible, even if it is less preferred in accordance with the present invention, to provide as at least one gas injection unit one or more IGF injection units, such as one or more eductors with each having one or more nozzles and a mixer.

The underflow weir as well as the overflow weir are in particular plates, such as metal plates. The plates can be partially perforated or unperforated. It is in particular preferred that the at least one underflow weir comprises in its uppermost portion perforation openings in order to allow a gas/vapor communication between the upstream and downstream sections of the at least one underflow weir, such as in the embodiment, which is described further below, that the vessel comprises several cells to allow a gas/vapor communication between the cells. However, alternatively other means can be used as weirs in the present invention.

In order that on the one hand the channel formed between the underflow weir and the bottom is large enough, to allow enough dispersion to flow into the vessel so as to maintain the required liquid level in the flotation vessel as well as the required output flow from the flotation apparatus, but on the other hand small enough so that its contribution to the high separation efficiency of the flotation apparatus is exploited, it is proposed that preferably the distance between the bottom of the vessel to the lowest point of the lower edge of the underflow weir is 10 to 25% of the height of the vessel. In the preferred embodiment that the underflow weir is a plate with a straight edge being parallel to the horizontal plane, all points of the lower edge of the underflow weir are at the same height. However, the present invention is not limited to such plates, but also covers plates with edges being not parallel to the horizontal plane or even not straight. Height is defined in this connection as the longest distance between the lowest point of the vessel wall and the uppermost point of the vessel wall, i.e. in the case of a cylindrical vessel, the inner diameter.

Moreover, it is preferred that the distance between the uppermost point of the upper edge of the overflow weir and the top of the vessel is 20 to 50% of the height of the vessel. This allows to have during the operation of the flotation apparatus a sufficiently high water level so as to have in the flotation section (which is the section downstream of the overflow weir) a sufficient height for an efficient flotation and in the entrance and mixing section (which is the section between the underflow weir and the overflow weir) a sufficient height for an efficient gas bubble distribution and a complete or at least essentially complete conversion of the oil droplets included in the dispersion to aggregates with adhered gas bubbles.

In accordance with another preferred embodiment of the present invention, the vertical distance between the underflow weir and the overflow weir is 30 to 80% and more preferably 40 to 60% of the height of the vessel. The vertical distance between the underflow weir and the overflow weir means the distance between the lower edge of the underflow weir and the upper edge of the overflow weir.

In accordance with still another preferred embodiment of the present invention, the horizontal distance between the underflow weir and the overflow weir is 10 to 25% of the height of the vessel.

In accordance with an embodiment of the present invention, the vessel of the flotation apparatus comprises in its longitudinal direction one or more longitudinal cell sections. Each of these longitudinal cell sections, if more than one is present, is preferably separated from an adjacent longitudinal cell section by an underflow weir. The number of longitudinal cell sections depend on the required capacity of the flotation apparatus.

For a small capacity, a vessel with one longitudinal cell section will be sufficient. The vessel can then comprise the units and members described above. Moreover, an inlet area can be provided upstream of the underflow weir and an outlet area can be provided downstream of the one longitudinal cell section. In addition, it is preferred that in this embodiment at the downstream end of the vessel a second underflow weir and downstream thereof a second overflow weir are arranged, so as to divide the flotation section of the vessel from the outlet area downstream thereof. This arrangement effects that the purified first fraction (in particular clear water) is withdrawn from the flotation section of the longitudinal cell section via first an underflow and then an overflow weir.

If a larger separation efficiency is required, the vessel of the flotation apparatus can comprise 2 to 8, more preferably 3 to 5 and most preferably 4 longitudinal cell sections. At least one of the longitudinal cell sections and preferably all of the longitudinal cell sections are composed as described above for the embodiment of the vessel comprising only one longitudinal cell section. In this embodiment it is preferred that the longitudinal cell sections are arranged in series so that the underflow weir of each of the longitudinal cell sections being arranged downstream of an adjacent longitudinal cell section forms the downstream end of the adjacent longitudinal cell section. In this embodiment, at the downstream end of the most downstream longitudinal cell section a further underflow weir and downstream thereof a further overflow weir can be provided so as to divide the flotation section of the most downstream longitudinal cell section from the outlet area downstream thereof.

If the vessel of the flotation apparatus in accordance with the present invention comprises two or more longitudinal cell sections, it is preferred that each of these longitudinal cell sections comprises:

one underflow weir extending down from its upper edge being fixed at the upper part (and preferably at the top side) of the vessel to its lower edge which terminates above the bottom of the vessel so as to form a channel between the lower edge of the weir and the bottom of the vessel so as to allow dispersion to flow through the channel, one overflow weir extending up from its lower edge being fixed at the bottom of the vessel to its upper edge which terminates underneath the head of the vessel so as to form a channel between the upper edge of the weir and the head of the vessel so as to allow dispersion to flow through the channel, wherein the overflow weir is located in a distance to and displaced in the direction to the downstream end of the vessel from the underflow weir so as to form between the underflow weir and the overflow weir a channel allowing the dispersion to flow from the bottom up to the upper edge of the overflow weir, one gas injection unit comprising at least one opening for injecting gas or a dispersion of gas in liquid into the vessel, wherein the at least one opening of the at least one gas injection unit is located vertically below the underflow weir or is located in the channel formed between the underflow weir and the overflow weir and is located at a height being below the lower edge of the underflow weir, one removal unit for removing the second fraction being formed during the operation of the flotation apparatus on the liquid level from the liquid level, wherein the removal unit is located at the downstream end of the longitudinal cell section of the vessel and one ejector unit configured to hydraulically push the second fraction being formed during the operation of the flotation apparatus on the liquid level of the vessel into the removal unit.

Alternatively, each of the longitudinal cell sections is composed as described above, except that one or more of the longitudinal cell sections arranged at the downstream end of the vessel do not comprise any gas injection unit. For instance, the vessel can comprise four longitudinal cell sections, wherein the first—seen from the upstream to the downstream end of the vessel—three longitudinal cell sections comprise one gas injection unit, whereas the last longitudinal cell section does not comprise gas any injection unit. Likewise, the vessel can comprise four longitudinal cell sections, wherein the first—seen from the upstream to the downstream end of the vessel—two longitudinal cell sections comprise one gas injection unit, whereas the last two longitudinal cell section do not comprise gas any injection unit.

In accordance with a particular preferred embodiment of the present invention, the ratio of the length of each of the longitudinal cell sections to the height of the vessel is 0.5 to 3, more preferably 0.8 to 1.8 and most preferably 1.0 to 1.5.

In a further development of the idea of the present invention, it is proposed that the ratio of the horizontal distance between the underflow and overflow weirs of each of the longitudinal cell sections to the length of the longitudinal cell section (i.e. the horizontal distance between the upstream end and the downstream end of the longitudinal cell section) is 5 to 20%.

The present invention is not particularly limited concerning the dimensions of the vessel. Thus, the vessel can be a vertical vessel having a larger height than length or a horizontal vessel having a larger length than height. Good results are in particular obtained with horizontal vessels and particularly with horizontal vessels having a ratio of length to height ratio effecting a retention time in the vessel of more than 3 minutes and more preferably of more than 4 minutes.

Preferably, the ratio of the length of the vessel to the height of the vessel is 2 to 10 and more preferably 4 to 8.

Likewise to this, the present invention is not particularly limited concerning the form of the vessel. Suitable examples are vessels having a rectangular or a circular cross-section. The gas outlet can be arranged in particular on top of the vessel.

Another aspect of the present invention is a method for separating one phase from a dispersion containing at least a first continuous phase and a second dispersed phase and in particular for separating oil from a dispersion containing water as continuous phase and oil as dispersed phase, wherein the method is carried out in the flotation apparatus described above.

Preferably, the one embodiment of the method comprises the following steps:
a) feeding a dispersion containing at least a first continuous phase, preferably water, and a second dispersed phase, preferably oil, into the inlet for the dispersion at the upstream end of the vessel with a flow rate so that during the operation of the method in the vessel a liquid level is maintained, which is above the upper edge(s) of the overflow weir(s),
b) feeding gas or a dispersion of gas in liquid, preferably a mixture of water in which pressurized gas is dispersed, into the at least one gas injection unit,
c) removing the second fraction being rich in the second dispersed phase, preferably oil-froth, via the removal unit,
d) removing the first fraction being low in the second dispersed phase, preferably clear water, via the first outlet, and
e) removing gas via the gas outlet.

In accordance with a preferred embodiment of the present invention, for removing the second fraction, i.e. preferably the oil-froth, from the water level, at least one of a stream of liquid, a stream of gas, and a stream of liquid and gas is ejected onto at least one of the liquid level of the vessel and the second fraction formed during the operation of the flotation apparatus on the liquid level of the vessel for hydraulically pushing during the method the second fraction being formed during the operation of the flotation apparatus on the liquid level of the vessel into the removal unit. Thus, the method is preferably performed with a flotation apparatus, in which as an ejector unit for ejecting a stream of liquid, a stream of gas or a stream of liquid and gas onto the liquid level of the vessel or onto the second fraction being formed during the operation of the flotation apparatus on the liquid level of the vessel is applied.

Preferably, the stream is ejected through the outlet(s) of the at least one hydraulic unit so that a two-dimensional film of at least one of liquid and gas forms in the horizontal plane or at an angle of more than 0° to 20° angled downwards from the horizontal plane over at least 30%, preferably over at least 50%, more preferably over at least 80%, even more preferably over at least 90% and most preferably over the whole width of the vessel.

The method of the present invention is particularly suitable for removing oil from a dispersion of oil in water having an oil content of up to several thousands ppm, such as 100 to 1,000 ppm, such as 200 to 500 ppm. The separation efficiency of the method in accordance with the present invention is preferably at least 90%, more preferably at least 98% and most preferably at least 99%.

In accordance with another preferred embodiment of the present invention, the method is performed as DGF. Preferably, the gas, such as air, nitrogen or carbon dioxide, is dissolved in water and this mixture is pressurized to 300 to 600 kPa, before it is injected via the at least one injection unit into the dispersion. The required water can be a part of the purified water obtained as first fraction, which is recycled to the gas dissolution unit, in which the gas is dissolved under pressure in the water, before the mixture is transferred to the at least one injection unit.

During the method, auxiliaries, such as one or more pH adjustment agents, one or more flocculants and/one or more coagulants, can be added to the dispersion, for instance by injecting them at a location close to the openings of the at least one injection unit or by adding them into the water used for preparing the mixture of water into which pressurized gas is dissolved or dispersed, respectively.

In accordance with a particular preferred embodiment of the present invention, the method is performed so that the retention time in the vessel is more than 3 minutes and more preferably more than 4 minutes.

BRIEF DESCRIPTION OF DRAWINGS

The invention will be explained in more detail hereinafter with reference to the drawings.

FIG. 3 shows a schematic perspective view onto the liquid level of the section shown in FIG. 2 showing the ejector unit configured to hydraulically push the second fraction into the removal unit.

DETAILED DESCRIPTION

Figure 1:
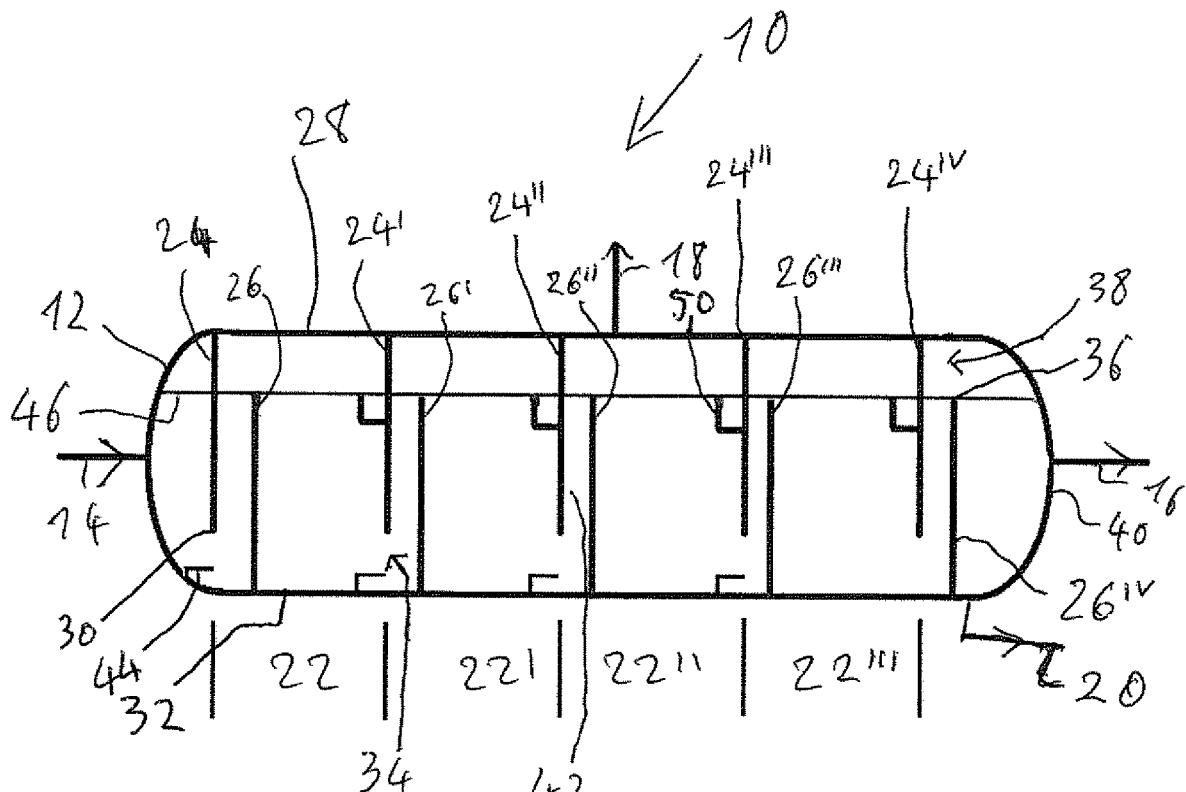
FIG. 1 shows a schematic cross-sectional view of a flotation apparatus comprising a vessel with four longitudinal cell sections in accordance with the present invention.

The flotation apparatus 10 shown in FIG. 1 comprises a horizontal flotation vessel 12 having a ratio of length to height of about 4:1. The flotation vessel comprises on its left end (which is the upstream end) an inlet for the oil in water dispersion 14, on its right end (which is the downstream end) an outlet for the purified water fraction 16, on its upper end an outlet for gas 18 and furthermore on its lower end an outlet for the oil fraction 20. The flotation vessel 12 is divided into four longitudinal cells 22, 22', 22'', 22''', which are each separated from each other in the longitudinal direction of the flotation vessel 12 by underflow weirs 24, 24', 24'', 24''', 24'''.

Figure 2:
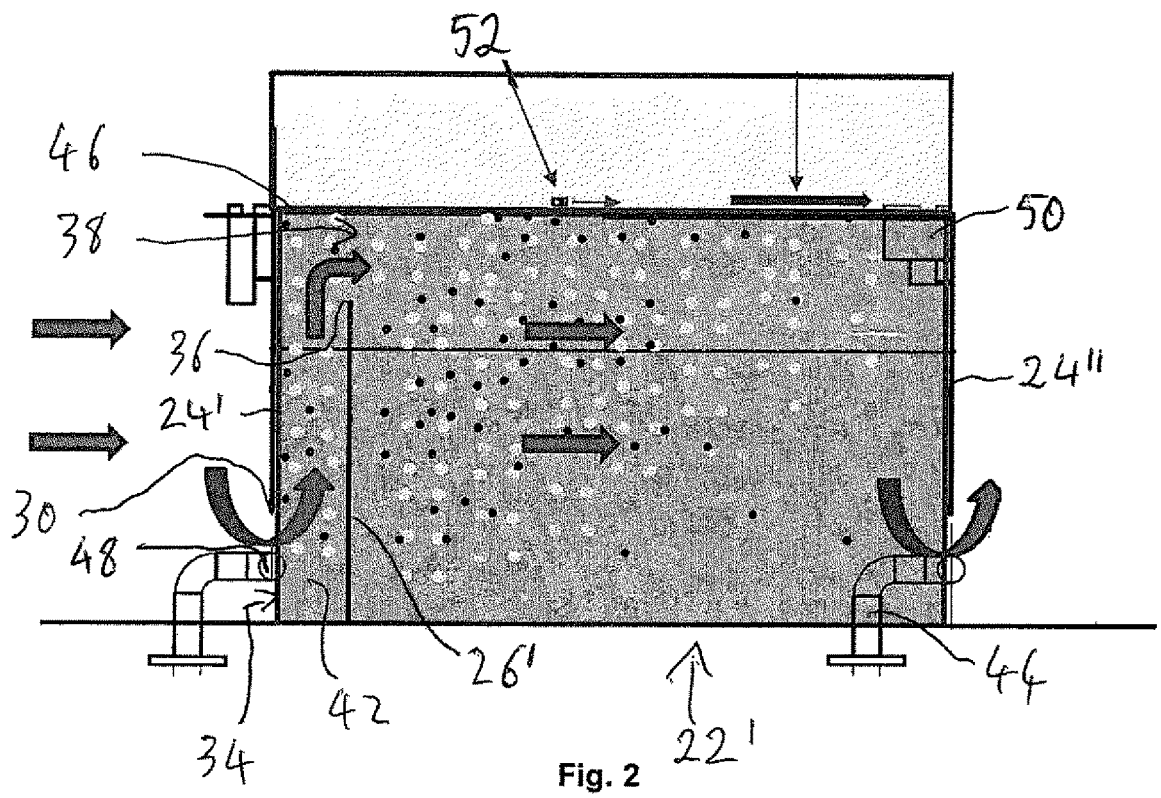
FIG. 2 shows an enlarged schematic view of one of the second of the four longitudinal cell sections of the vessel of the flotation apparatus shown in FIG. 1.

As can be seen in FIGS. 1 and 2, each of the four longitudinal cells 22, 22', 22'', 22''' comprises an underflow weir 24, 24', 24'', 24''', 24$^{\prime v}$ and an overflow weir 26, 26', 26'', 26''', 26$^{\prime v}$. Each of the underflow weirs 24, 24', 24'', 24''', 24$^{\prime v}$ extends down from the head 28 of the flotation vessel 12 to the lower edge 30 of the underflow weir 24, 24', 24'', 24''', which terminates above the bottom 32 of the flotation vessel 12 so as to form a channel 34 between the lower edge 30 of the weir 24, 24', 24'', 24''', 24$^{\prime v}$ and the bottom 32 of the flotation vessel 12 so as to allow dispersion to flow through the channel 34.

Moreover, each of the overflow weirs 26, 26', 26'', 26''', 26$^{\prime v}$ extends up from the bottom 32 of the flotation vessel 12 to the upper edge 36 of the overflow weir 26, 26', 26'', 26''', which terminates underneath the head 28 of the flotation vessel 12 so as to form a channel 38 between the upper edge 36 of the weir 26, 26', 26'', 26''', 26$^{\prime v}$ and the head 28 of the flotation vessel 12 so as to allow dispersion to flow over the upper edge 36 of the overflow weir 26, 26', 26'', 26''', 26$^{\prime v}$ and through the channel 38. The (seen from the upstream end of the flotation vessel 12) second overflow weir 26' of the flotation vessel 12 shown in FIG. 2 is part of the second longitudinal cell section 22' of the flotation vessel 12, whereas the downstream overflow weir 26'' shown in FIG. 2 is part of the next, third longitudinal cell section 22'' of the flotation vessel 12.

The overflow weirs 26, 26', 26'', 26''', 26$^{\prime v}$ of each longitudinal cell section 22, 22', 22'', 22''' are located in a distance to and displaced in the direction to the downstream end 40 of the flotation vessel 12 from the respective underflow weirs 24, 24', 24'', 24''', 24$^{\prime v}$ of the same longitudinal cell section 22, 22', 22'', 22''' so that in each longitudinal cell section 22, 22', 22'', 22''' a channel 42 is formed between the respective underflow weir 24, 24', 24'', 24''', 24$^{\prime v}$ and the respective overflow weir 26, 26', 26'', 26''', 26'. This channel 42 allows the oil in water dispersion to flow from the bottom up to and over the upper edge 36 of the respective overflow weir 26, 26', 26'', 26''', 26$^{\prime v}$. The space between each of the respective underflow weirs 24, 24', 24'', 24''', 24$^{\prime v}$ and the respective overflow weir 26, 26', 26'', 26''', 26$^{\prime v}$ of each longitudinal cell 22, 22', 22'', 22''' form the entrance and mixing section of each longitudinal cell section 22, 22', 22'', 22''' of the flotation vessel 12, in which an efficient gas injection and a homogenous gas bubble distribution in the water-oil dispersion is achieved. On the other hand, each of the sections downstream the respective overflow weir 26, 26', 26'', 26''', 26$^{\prime v}$ of each longitudinal cell 22, 22', 22'', 22''' forms the flotation section of each longitudinal cell 22, 22', 22'', 22''', where the aggregates of gas bubbles adhered to oil droplets float up. The flotation sections allow that—due to the efficient gas bubble adherence in the entrance and mixing section—essentially all of the oil droplets rise up to the water level 46 and form there an oil-froth layer or sludge layer, respectively.

In each of the four longitudinal cell sections 22, 22', 22'', 22''' one gas injection unit 44 is arranged. Each of these gas injection units 44 comprises several openings (not shown) for injecting a dispersion of water, in which pressurized gas is contained, into the flotation vessel 12. In fact, the gas injection unit 44 schematically shown in FIG. 2 comprises a pipe, which comprises a pressure release valve (not shown) so as to keep the mixture including liquid and pressurized gas upstream of the pressure release valve under pressure. Furthermore, the gas injection unit further comprises a distributor 48, which comprises a plurality of openings (not shown) for distributing the gas into the dispersion. More specifically, the distributor 48 is a pipe extending perpendicular to the length axis of the vessel, i.e. in width direction of the vessel, wherein the plurality of openings is provided in the upper half of the pipe. As schematically shown in FIG. 2, the openings of the gas injection unit 44 are located in the channel 42 formed between the underflow weir 24' and the overflow weir 26' and is located at a height being below the lower edge 30 of the underflow weir 24', but above the bottom 32 of the flotation vessel 12.

Each of the longitudinal cell section 22, 22', 22'', 22''' of the vessel 12 comprises, as shown in FIG. 2 for the second longitudinal cell section 22' and as subsequently described with reference to the second longitudinal cell section 22', at its downstream end a removal unit 50, respectively, for removing the second oil rich fraction (i.e. oil-froth) from the flotation vessel 12. More specifically, the removal unit 50 is a skim bucket 50, which is an essentially cubic box with four side walls and a bottom wall, wherein the upper side thereof is open and bordered by the upper edges of the four sidewalls. The skim bucket 50 is fixed with one of its sidewalls to the underflow weir 24'' of the adjacent downstream longitudinal cell section 22'' so that the three remaining sidewalls form overflow edges, above which the oil-froth enters into the skim bucket 50. The skim bucket 50 comprises at its bottom side an opening (not shown) for removing the oil-froth and for discharging it from the vessel 12. A sludge separator (not shown) can be provided downstream of the skim bucket 50, wherein this sludge separator separates residual water from the oil-froth. The water removed by the sludge separator can be recycled into the vessel 12, such as into the inlet 14 or into the first channel 42 formed between the underflow weir 24 and the overflow weir 26 of the first longitudinal cell section 22. The opening (not shown) for removing the oil-froth and for discharging it from the vessel 12 is connected with the outlet for the oil fraction 20.

In order to achieve an efficient, complete and proper transfer of the oil-froth from the water level 46 into the skim bucket 50 and thus in order to achieve an efficient, complete and proper removal of the oil-froth from the water level 46 without swirling the interface between the water level 46 and the oil-froth, upstream of the removal unit 50 (but downstream of the overflow weir 26') and at a height being above the upper edge 36 of the overflow weir 26' a hydraulic unit or ejector unit 52, respectively, for ejecting a stream of water 53 is arranged. The ejector unit 52 is arranged and embodied so as to push the oil-froth being formed during the operation of the flotation apparatus 10 on the liquid level of the flotation vessel 12 into the skim bucket 50 using the ejected stream of water 53. More specifically, the ejector unit 52 is composed of a pipe 54, to which two spray heads 56, 56' are fixed, wherein each of the two spray heads 56, 56' comprises a plurality of spray nozzles 58. The pipe 54 is connected with a water inlet (not shown) and is thus fed during the operation with water so as to eject a stream of water 53. The ejector unit 52 and in particular the spray heads 56, 56' of the ejector unit 52 are arranged at a height being slightly above (about more than 0% to 5% of the height of the vessel above) the upper edge 36 of the overflow weir 26'. The spray heads 56, 56' of the ejector unit 52 are embodied so that they eject the stream of water 53 at an angle α of about 10° downwards with regard to the horizontal plane H. The spray heads 56, 56' and the spray nozzles 58 are embodied and arranged so that the stream of water 53 is ejected through the spray nozzles 58 so that a two-dimensional water film (only schematically shown in FIG. 3) extending over essentially the whole width liquid level 46 of the vessel 12 forms, which pushes the oil-froth formed on the liquid level 46 into the skim bucket 50.

During the operation of the flotation apparatus 10, a dispersion of oil in water, such as for instance a dispersion including 300 ppm oil, is continuously fed into the inlet 14 for the dispersion at the upstream end of the vessel 12. The flow rate is adjusted so that during the operation a liquid level 46 is maintained in the vessel, which is above the upper edges 36 of the overflow weirs 26, 26', 26", 26'", 26'ᵛ. In addition, gas, such as air, is continuously dissolved under pressure (of 300 to 600 kPa) in water and in particular in a partial recycle stream of the clear water formed at the downstream end 40 of the vessel 12. The so produced mixture of water with dissolved or dispersed, respectively, pressurized gas is continuously injected into the entrance and mixing sections formed between the overflow weirs 24, 24', 24", 24'" and the overflow weirs 26, 26', 26", 26'" of each of the longitudinal cell sections 22, 22', 22", 22'" using the gas injection unit 44. Upon leaving the openings of the gas injection unit 44, the pressurized gas releases into the dispersion and forms tiny bubbles having an average size of 10 to 100 µm. The gas bubbles are homogenously distributed over the cross-section of the channels 42 and rise up, whereupon the gas bubbles adhere to the oil droplets included in the dispersion, thus forming aggregates of oil droplets with adhered gas bubbles. On account of the adhered gas bubbles, these aggregates have a lower density than the continuous water phase. Due to this, the aggregates rise up to the water level 46 of the continuous water phase forming an oil-froth. The oil-froth is continuously pushed into the skim buckets 50 using the film formed by the stream of water 53 ejected by the spray nozzles 58 of the spray heads 56, 56' of the ejector unit 52. The removed oil-froth is continuously discharged from the skim buckets 50 and from the vessel 12. Likewise, the clear water is continuously discharged from the vessel 12 via the outlet 16 and the gas is continuously discharged from the vessel 12 via the outlet 18.

The invention claimed is:

1. A flotation apparatus configured to separate one phase from a dispersion containing at least a first continuous phase and a second dispersed phase so as to form a first fraction and a second fraction, the second fraction having a higher amount of the second dispersed phase than the first fraction, the flotation apparatus comprising a vessel having:
   an inlet defining an upstream end of the vessel,
   a first outlet for the first fraction defining a downstream end of the vessel,
   a second outlet for the second fraction,
   a gas outlet,
   at least one underflow weir,
   at least one overflow weir, the overflow weir being located in a direction toward the downstream end of the vessel from the underflow weir,
   at least one gas injection unit comprising at least one opening configured to inject gas or a dispersion of gas in liquid into the vessel, the at least one opening being located vertically below the at least one underflow weir or being located in a channel formed between the at least one underflow weir and the at least one overflow weir,
   at least one container configured to remove the second fraction from a liquid level, the second fraction being formed on the liquid level during operation of the flotation apparatus, and
   at least one ejector configured to hydraulically push the second fraction into the container using at least one of a liquid stream, a liquid/gas stream, and a gas stream, the respective at least one of the liquid stream, liquid/gas stream, and the gas stream being ejected by the ejector onto at least one of: the liquid level of the vessel and the second fraction formed on the liquid level during the operation of the flotation apparatus, and
   a vertical distance between the underflow weir and the overflow weir being 30 to 80% of a height of the vessel, the vertical distance between the underflow weir and the overflow weir being a distance between a lower edge of the underflow weir and an upper edge of the overflow weir.

2. The flotation apparatus in accordance with claim 1, wherein:
   the at least one underflow weir extends down from a second upper edge fixed at an upper part of the vessel to the lower edge which terminates above a bottom of the vessel so as to form a second channel between the lower edge of the underflow weir and the bottom of the vessel so as to allow dispersion to flow through the second channel, and
   the at least one overflow weir extends up from a second lower edge fixed at the bottom of the vessel to the upper edge which terminates underneath a head of the vessel so as to form a third channel between the upper edge of the overflow weir and the head of the vessel so as to allow dispersion to flow over the upper edge of the overflow weir and through the third channel, the overflow weir being located in the direction toward the downstream end of the vessel from the underflow weir so as to form the channel allowing the dispersion to flow from the bottom of the vessel up to the upper edge of the overflow weir.

3. The flotation apparatus in accordance with claim 1, wherein the at least one container and the at least one ejector are both arranged in the direction toward the downstream end of the vessel from the overflow weir.

4. The flotation apparatus in accordance with claim 1, wherein the at least one ejector is arranged in a direction toward the upstream end of the vessel from the container and at a height of the upper edge of the overflow weir or at a height above the upper edge of the overflow weir.

5. The flotation apparatus in accordance with claim 1, wherein the flotation apparatus comprises at least one further underflow weir located in the direction toward the downstream end of the vessel from the overflow weir, wherein the at last one container and the at least one ejector are arranged between the at least one overflow weir and the at least one further underflow weir.

6. The flotation apparatus in accordance with claim 1, wherein the at least one ejector is arranged such that the at least one of the liquid stream, liquid/gas stream, and the gas stream being ejected by the ejector pushes the second fraction into the container.

7. The flotation apparatus in accordance with claim 1, wherein the at least one ejector is a pipe comprising one or more spray heads, wherein each of the one or more spray heads comprises at least one spray nozzle.

8. The flotation apparatus in accordance with claim 1, wherein the at least one ejector ejects the at least one of the liquid stream, liquid/gas stream, and the gas stream in a horizontal plane or at an angle α of more than 0° to 20° angled downwards from the horizontal plane.

9. The flotation apparatus in accordance with claim 1, wherein the at least one ejector ejects the at least one of the liquid stream, liquid/gas stream, and the gas stream in a form of a film over at least 30% of an entire width of the vessel.

10. The flotation apparatus in accordance with claim 9, wherein the at least one ejector ejects the at least one of the liquid stream, liquid/gas stream, and the gas stream in the form of the film, wherein a difference of flow rate over a width of the film is less than 25% of an average flow rate of the film.

11. The flotation apparatus in accordance with claim 1, wherein the at least one container comprises at least one skim bucket, wherein the at least one skim bucket comprises at a third upper end an overflow edge, which is arranged at the height of the upper edge of the overflow weir.

12. The flotation apparatus in accordance with claim 1, wherein the at least one opening of the at least one gas injection unit is arranged at a height below the lower edge of the underflow weir and is arranged vertically below the lower edge of the underflow weir.

13. The flotation apparatus in accordance with claim 1, wherein the vessel comprises in a longitudinal direction 2 to 8 longitudinal cell sections, wherein the longitudinal cell sections are arranged in series so that the underflow weir of each of the longitudinal cell sections, each arranged in the direction toward the downstream end of the vessel from an adjacent longitudinal cell section, forms the downstream end of the adjacent longitudinal cell section.

14. The flotation apparatus in accordance with claim 13, wherein each of the longitudinal cell sections comprises:
   one underflow weir extending down from a second upper edge fixed at an upper part of the vessel to the lower edge which terminates above a bottom of the vessel so as to form a second channel between the lower edge and the bottom of the vessel so as to allow dispersion to flow through the second channel,
   one overflow weir extending up from the second lower edge fixed at the bottom of the vessel to the upper edge which terminates underneath a head of the vessel so as to form a third channel between the upper edge and the head of the vessel so as to allow dispersion to flow through the third channel, wherein the overflow weir is located in the direction toward the downstream end of the vessel from the underflow weir so as to form the channel allowing the dispersion to flow from the bottom of the vessel up to the upper edge of the overflow weir,
   one gas injection unit comprising at least one opening for injecting gas or a dispersion of gas in liquid into the vessel, wherein the at least one opening of the one gas injection unit is located vertically below the underflow weir or is located in the channel formed between the underflow weir and the overflow weir and is located at a height below the lower edge of the underflow weir,
   one container configured to remove the second fraction from the liquid level, wherein the container is located at the downstream end of the longitudinal cell section of the vessel, and
   one ejector configured to hydraulically push the second fraction into the container.

15. A method for separating one phase from a dispersion containing at least a first continuous phase and a second dispersed phase, the method being carried out in the flotation apparatus in accordance with claim 1, the method comprising the following steps:
   a) feeding the dispersion containing at least the first continuous phase and the second dispersed phase via the inlet with a flow rate into the vessel such that during the operation of the method in the vessel, a liquid level is maintained, which is above the upper edge of the overflow weir,
   b) feeding gas or a dispersion of gas in liquid into the at least one gas injection unit,
   c) removing the second fraction via the container,
   d) removing the first fraction via the first outlet for the first fraction, and
   e) removing gas via the gas outlet.

* * * * *